United States Patent
Gilbert

(10) Patent No.: US 9,977,894 B2
(45) Date of Patent: May 22, 2018

(54) VIRTUAL MACHINE MALWARE SCANNING

(71) Applicant: Red Hat, Inc., Raleigh, NC (US)

(72) Inventor: David Gilbert, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 104 days.

(21) Appl. No.: 14/944,291

(22) Filed: Nov. 18, 2015

(65) Prior Publication Data
US 2017/0142134 A1 May 18, 2017

(51) Int. Cl.
*H04L 29/06* (2006.01)
*G06F 21/50* (2013.01)
*G06F 21/56* (2013.01)

(52) U.S. Cl.
CPC ............ *G06F 21/50* (2013.01); *G06F 21/564* (2013.01)

(58) Field of Classification Search
USPC .......................................................... 726/23
See application file for complete search history.

(56) References Cited

U.S. PATENT DOCUMENTS

| | | | |
|---|---|---|---|
| 7,305,592 B2 * | 12/2007 | Neiger ................ | G06F 9/45533 714/42 |
| 7,418,729 B2 | 8/2008 | Szor | |
| 7,793,287 B2 * | 9/2010 | Lowell ................ | G06F 9/45537 718/1 |
| 7,836,504 B2 | 11/2010 | Ray et al. | |
| 8,011,010 B2 | 8/2011 | Michael et al. | |
| 8,055,737 B2 | 11/2011 | Ciano et al. | |
| 8,516,478 B1 | 8/2013 | Edwards et al. | |
| 8,572,741 B2 * | 10/2013 | Sapuntzakis ............ | G06F 21/52 718/1 |
| 8,763,115 B2 | 6/2014 | Budko et al. | |
| 2006/0136720 A1 * | 6/2006 | Armstrong ............... | G06F 21/53 713/164 |
| 2007/0143843 A1 * | 6/2007 | Nason .................... | G06F 21/568 726/22 |
| 2008/0016572 A1 * | 1/2008 | Burkhardt ............... | G06F 21/57 726/24 |
| 2008/0263658 A1 * | 10/2008 | Michael ................. | G06F 21/562 726/22 |
| 2008/0320594 A1 | 12/2008 | Jiang | |
| 2009/0089879 A1 * | 4/2009 | Wang ....................... | G06F 21/53 726/24 |
| 2009/0119664 A1 * | 5/2009 | Pike ...................... | G06F 9/45558 718/1 |

(Continued)

OTHER PUBLICATIONS

Tina De Benedictis et al. "Antivirus Best Practices for VMware® Horizon View™ 5.x" https://www.vmware.com/files/pdf/VMware-View-AntiVirusPractices-TN-EN.pdf, 2013, 18 pages.

(Continued)

*Primary Examiner* — Harris C Wang
(74) *Attorney, Agent, or Firm* — Haynes and Boone LLP

(57) ABSTRACT

Methods, systems, and computer program products for selecting a virtual machine to perform a task corresponding to a client request and performing the task at the virtual machine. After performing the task at the virtual machine, an indicator corresponding to a shutdown of the virtual machine is detected. After detecting the indicator and prior to the shutdown of the virtual machine, a memory space is preserved corresponding to the virtual machine. The preserved memory space is then scanned for malware.

20 Claims, 4 Drawing Sheets

(56) References Cited

U.S. PATENT DOCUMENTS

2012/0144489 A1 6/2012 Jarrett et al.
2014/0053272 A1 2/2014 Lukacs et al.
2015/0178497 A1* 6/2015 Lukacs ................... G06F 9/461
                                                            726/23

OTHER PUBLICATIONS

Kaspersky Lab, "Security for Virtualization: Finding the Right Balance" http://media.kaspersky.com/documents/business/brfwn/en/Finding-the-right-balance_Kaspersky-Security-for-Virtualization-while-paper.pdf, accessed Oct. 23, 2015, 9 pages.

Jason Gionta et al. "SEER: Practical Memory Virus Scanning as a Service" http://www.enck.org/pubs/gionta-acsac14.pdf, Dec. 8-12, 2014, 10 pages.

* cited by examiner

VIRTUAL MACHINE MALWARE SCANNING

BACKGROUND

The present disclosure relates generally to virtual computing systems, and more particularly to detecting malware in a virtual computing system.

Malware is a term that refers to malicious software. Malware includes software that is designed with malicious intent to cause intentional harm and/or bypass security measures. Examples of malware include viruses, worms, ransomware, spyware, adware, rootkits and so forth. Malware causes many issues for users. For example, malware may negatively affect the resources of a computing device, invade user privacy by stealing information, adversely affect computing device stability, and/or hijack a computing device for illegitimate purposes. In many instances, users may not even be aware of the presence of the malware.

Programs such as malware scanners are used to detect and remove malware. Malware scanners may detect malware by comparing memory-resident data stored on the computing device with malware signatures and identifying matches. Matches between malware signatures and memory-resident data may indicate the presence of malware.

Traditionally, malware scanning has not been performed on virtual machines because in many instances virtual machines are short lived. For example, virtual machines may exist to process one or more tasks, after which time the virtual machines may be shutdown. Accordingly, malware on a virtual machine may exist only for the lifetime of the virtual machine. Because a virtual machine and any malware on the virtual machine may exist for only a short time, a security issue on the virtual machine that is exploited by the malware may be less likely to be discovered. This security issue may be exploited on other virtual machine instances, such that the malware may be repeatedly used to attack the virtual environment.

Therefore, a need exists for systems and techniques to detect malware in a virtual environment. In particular, systems and methods that perform malware scanning of virtual machines without significantly impacting virtual machine performance would provide a valuable improvement over conventional systems. Thus, while existing malware detection systems have been generally adequate for some computing systems, the techniques described herein achieve malware detection in a virtual environment without significantly impacting virtual machine performance.

BRIEF SUMMARY

According to an example, a method for selecting, by a virtual machine monitor, a virtual machine to perform a task corresponding to a client request. The method further includes performing the task at the virtual machine. The method further includes, after performing the task at the virtual machine, detecting an indicator corresponding to a shutdown of the virtual machine. The method further includes after detecting the indicator and prior to the shutdown of the virtual machine, preserving a memory space corresponding to the virtual machine. The method further includes performing a malware scan of the memory space.

According to an example, a computer program product stored on a non-transitory computer-readable medium includes machine readable instructions that when executed by a processor cause the processor to create, by a virtual machine monitor, a virtual machine; perform, at the virtual machine, one or more tasks corresponding to a client; after performing the one or more tasks, detect an indicator corresponding to a shutdown of the virtual machine; and after detecting the indicator, perform a malware scan corresponding to the virtual machine.

According to an example, a system includes a processor and a memory that includes a processor and a memory; a virtual machine monitor that is executed by the processor to create a virtual machine that is assigned a portion of the memory. The virtual machine monitor receives a client request; sets a hook corresponding to an indicator of a shutdown of the virtual machine; detects, based on the hook, the indicator of the shutdown of the virtual machine; prior to performing the shutdown of the virtual machine, preserves the portion of the memory; and triggers a malware scan corresponding to the portion of the memory.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
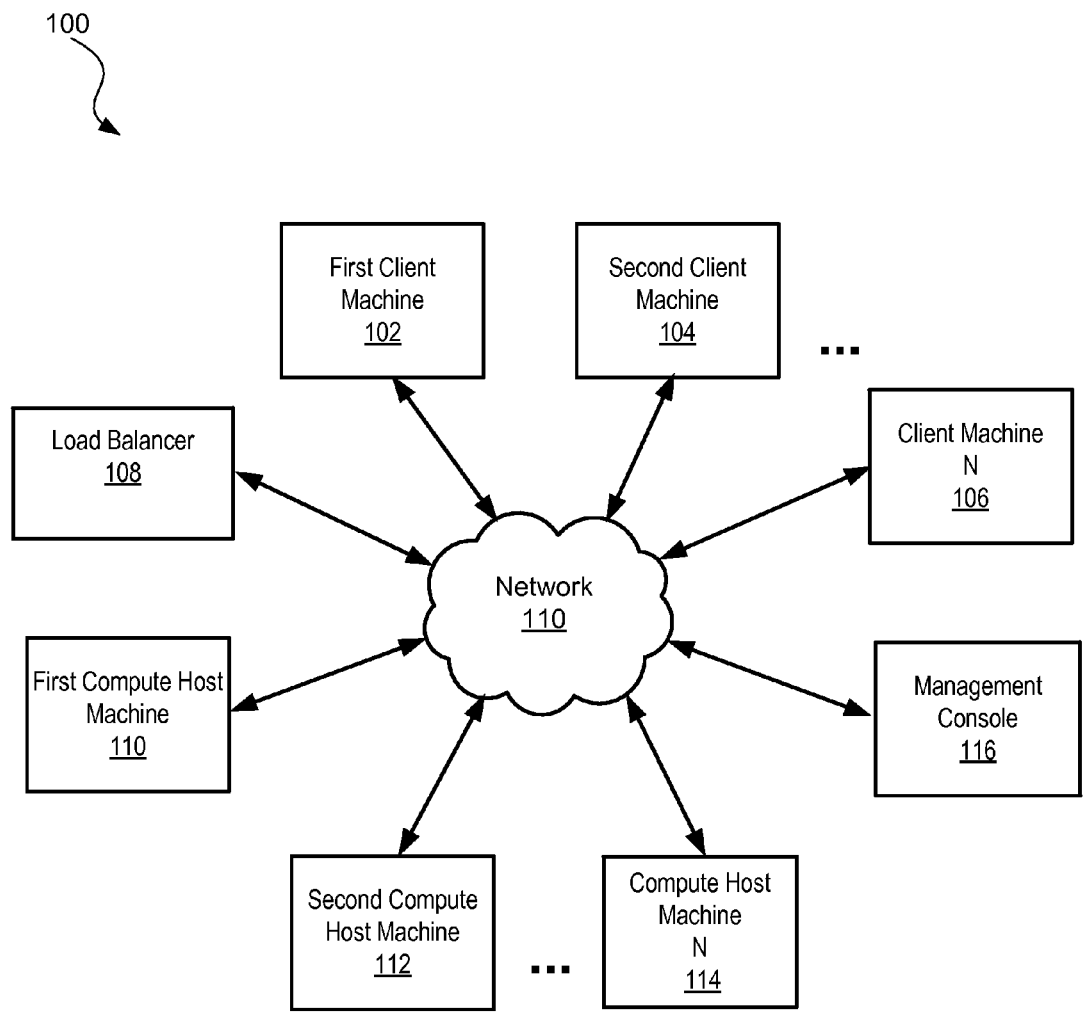
FIG. 1 is an organizational diagram illustrating an example of a cloud computing system, in accordance with various examples of the present disclosure.

FIG. 1 illustrates a cloud computing system 100, in which various aspects of the present disclosure may be implemented.

The cloud computing system 100 includes client machines, such as a first client machine 102, a second client machine 104, and a client machine N 106. In other examples there may be fewer or additional client machines. In the present example, each of the client machines is structured as a computing device, such as a rack mount server, desktop computer, laptop computer, handheld/mobile computing device, or other computing device.

The client computing machines are structured to connect to a load balancer 108 via a network 110. In the present example, the load balancer 108 is structured as a computing device, such as a rack mount server, desktop computer, laptop computer, or other computing device. In other examples, the load balancer 108 may also be structured as one or more virtual machines that run on computing devices such as a first compute host machine 110, second compute host machine 112 and/or compute host machine N 114. Accordingly, while one load balancer is illustrated, there may be a plurality of load balancers in the cloud computing system 100 that are configured on one or more computing devices.

In the present example, the load balancer 108 is structured to receive client requests from client machines (e.g., first client machine 102, second client machine 104, client machine N 106), and distribute the client requests to compute host machines (e.g., first compute host machine 110, second compute host machine 112, compute host machine N 114).

The load balancer 108 is structured to maintain heuristics that may be queried, such as available memory and CPU load corresponding to the compute host machines. Accordingly, based on the queried heuristics, the load balancer 108 is structured to distribute the client requests among the compute host machines in a manner that balances the memory usage and CPU load of the client requests. For example, the load balancer 108 may query the heuristics and determine that the first compute host machine 110 has a lower load (e.g., as measured by memory usage and CPU load) than the second host machine 112 and/or the compute host machine N 114. Accordingly, based upon the determination, the load balancer 108 may route a client request to the first compute host machine 110 for processing.

In the present example, the load balancer 108 is also structured to balance malware scanning among the compute host machines. In some examples, the load balancer 108 is structured to message compute host machines that have a lower CPU load and/or memory usage to instruct the compute host machines perform malware scanning, while compute host machines that have higher CPU load and/or memory usage may not be messaged to perform malware scanning. The load balancer 108 may perform the routing of client requests and the sending of malware scanning messages in a same task or in different tasks. For example, the load balancer 108 may be structured with a first task/process that performs load balancing with respect to client requests, and a second task/process that sends messages to compute host machines to instruct the compute host machines to perform load balancing.

In other examples, the load balancer 108 may adjust the frequency of malware scanning based on the heuristics. In more detail, when CPU load and/or memory usage of the compute host machines increases, the load balancer 108 may decrease the frequency of malware scanning on the compute host machines. When CPU load and/or memory usage decrease, the load balancer 108 may increase the frequency of malware scanning on the compute host machines. The load balancer 108 may increase the frequency of malware scanning by sending additional messages to compute host machines that instruct the compute host machines to perform malware scanning. The load balancer 108 may decrease the frequency of malware scanning by sending fewer messages to compute host machines that instruct the compute host machines to perform malware scanning. In other examples, the load balancer 108 may send compute host machines the frequency of which the compute host machines are to perform malware scanning, such that the compute host machines are structured to perform the malware scanning at the given frequency. The frequency may be updated by the load balancer 108 and/or compute host machines based on load balancing conditions such as CPU load, memory usage, and/or other load balancing conditions. Methods that may be performed by the load balancer 108 are discussed in further detail with respect to FIG. 3.

In the present example, the cloud computing system includes a network 110, which may include one or more sub-networks. For example, client machines (e.g., first client machine 102, second client machine 104, and client machine N 106) may be connected to the load balancer 108 via one or more internet networks, while load balancer 108 may be connected to compute host machines and the management console 116 via one or more intranet networks. The network 110 may include any combination of public and/or private networks. The network 110 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

In the present example, the network 110 is structured to route the client requests and malware scanning messages via remote procedure calls, TCP/IP, or any other message/signal routing protocol.

In the present example, each of the compute host machines (e.g., first compute host machine 110, second compute host machine 112, compute host machine N 114) is structured as a computing device, such as a rack mount server, desktop computer, laptop computer, and so forth. In some examples, compute host machines may be structured to host the load balancer 108, such as by running one or more load balancers on virtual machines.

In the present example, compute host machines are structured to request client requests from the load balancer 108. Further, compute host machines are structured to receive messages from the load balancer 108 that instruct the compute host machines to perform malware scanning. Compute host machines are described further with respect to FIG. 2. Methods for performing malware scanning on compute host machines are described further with respect to FIG. 4.

In the present example, the management console 116 is structured to interface with one or more users, who may configure malware scanning thresholds, view malware heuristics gathered from the compute host machines, configure malware scanners, update malware signatures, and so forth. In some examples, the management console 116 may be structured to run on a compute host machine, a client machine, or on a separate machine, such as a rack mount server, desktop computer, laptop computer, or other computing device.

In the present example, the management console 116 is structured to communicate with the load balancer 108 to set malware scanning thresholds, such as frequency of malware scanning based on CPU load and/or memory usage. For example, a pre-configured CPU load and/or memory usage threshold may be configured, such that (1) malware scanning frequency is increased in the cloud computing system 100 when CPU load and/or memory usage decreases below the pre-configured threshold; and (2) malware scanning frequency is decreased in the cloud computing system 100 when CPU load and/or memory usage increases above the pre-configured threshold.

The management console 116 is also structured to present heuristics regarding malware scanning. For example, the management console 116 may receive results of malware scanning from the compute host machines, which may be displayed via a graphical user interface. In addition, the management console 116 may update malware signatures on the compute host machines.

Figure 2:
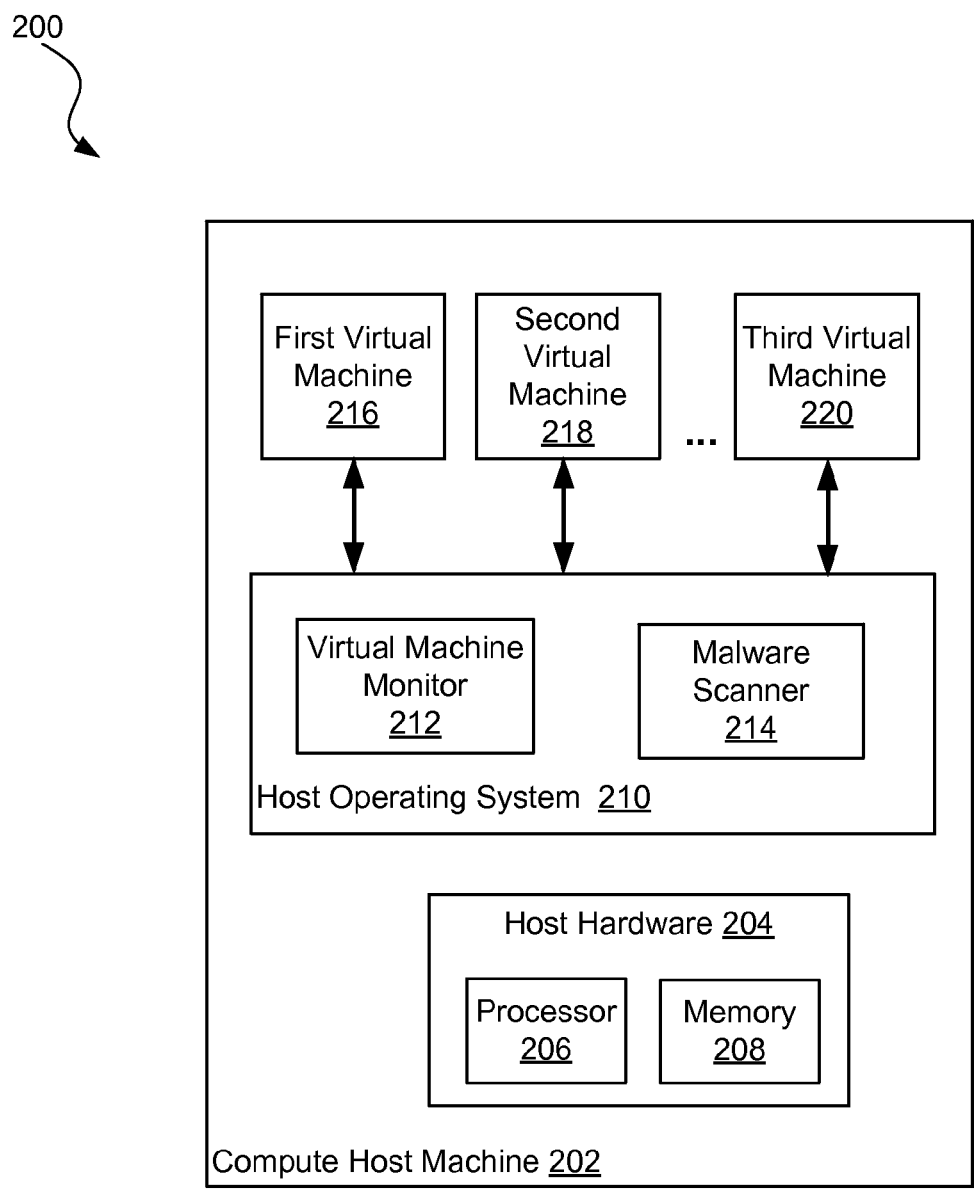
FIG. 2 is an organizational diagram illustrating an example of a computer system, in accordance with various examples of the present disclosure.

FIG. 2 illustrates an organizational diagram of a machine in the form of a computer system 200, within which a set of instructions may be executed to cause the machine to perform any one or more of the methodologies discussed herein.

In the present example, the computer system 200 includes a compute host machine 202. In the present example, the architecture of one or more of the first compute host machine 110, the second compute host machine 112, and/or the computer host machine N 114, as described with reference to FIG. 1, may be structured as illustrated by the compute host machine 202.

While a single machine is illustrated, the term "machine" shall also be taken to include any collection of machines that individually or jointly execute a set (or multiple sets) of instructions to perform any one or more of the methodologies discussed herein. Thus, compute host machine 202 may include a single machine or multiple host machines arranged in a cluster. In more detail, the machine may be connected (e.g., networked) to other machines in a LAN, an intranet, an extranet, or the Internet. The compute host machine 202 may operate in the capacity of a server or a client machine in client-server network environment, or as a peer machine in a peer-to-peer (e.g., distributed) network environment. The compute host machine 202 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

In the present example, the compute host machine 202 includes host hardware 204. Host hardware 204 includes physical elements such as a processor 206, memory 208, and other hardware components (e.g., a network interface device, keyboard, display, input devices, and so forth). Hardware elements such as the processor 206 and memory 208 may communicate with each other via a bus.

In the present example, the processor 206 represents one or more general-purpose processing devices such as a microprocessor, central processing unit, and the like. In more detail, processor 206 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 206 may also include one or more special-purpose processing devices such as an application specific integrated circuit (ASIC), a field programmable gate array (FPGA), a digital signal processor (DSP), network processor, or the like. In the present example, processor 206 is configured to execute instructions for performing the operations and steps discussed herein.

In the present example, the memory 208 represents a main memory (e.g., read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and/or data storage device. Memory 208 may include a computer-readable storage medium on which one or more sets of instructions (e.g., software) are stored embodying any one or more of the methodologies or functions described herein. The instructions may reside, completely or at least partially, within memory 208 and/or within processor 206 during execution of the instructions by processor 206. The instructions may further be transmitted or received over a network (such as the network 110 that is illustrated in FIG. 1) via a network interface device.

The term "computer-readable storage medium," as used above, may refer to any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. While memory 208 is shown in an example to be a single medium, the term "medium" should be taken to include a single medium or multiple media (e.g., a centralized or distributed database, and/or associated caches and servers) that store the one or more sets of instructions.

Compute host machine 202 includes a host operating system 210 stored on the memory 208 and executed by the processor 206 that installs and executes software programs. Compute host machine 202 includes a virtual machine monitor (VMM) 212, which also may be referred to as a hypervisor. In the present example, virtual machine monitor 212 is a component of host operating system 210. In other examples, virtual machine monitor 212 may run on top of host operating system 210, or may run directly on host hardware 204 without the use of a host operating system.

The malware scanner 214 may include one or more proprietary or third-party malware scanners. The malware scanner 214 is structured to scan memory spaces corresponding to the virtual machines to detect malware. In the present example, the virtual machine monitor 214 is structured to trigger the scanning of a memory space for malware by executing the malware scanner 214. In some examples, the virtual machine monitor 214 is structured to provide the malware scanner 214 with one or more files or addresses corresponding to the memory space(s) to scan for malware. In some examples, the malware scanner 214 compares portions of a memory space with malware signatures to detect matches, which may be identified as potential malware threats.

Virtual machine monitor 212 manages system resources, including access of virtual machines (e.g., first virtual machine 216, second virtual machine 218, and third virtual machine 220) to processor 206, memory 208, and other host hardware devices. In the present example, virtual machine monitor 212 is implemented in software and provides one or more virtual machines, such as the first virtual machine 216, the second virtual machine 218, and the third virtual machine 220. In the present example, each virtual machine is an underlying emulation of compute host machine 202. Each virtual machine may be, for example, a hardware emulation, full virtualization, para-virtualization, and operating system-level virtualization virtual machine.

In the present example, each virtual machine may include a virtual CPU, virtual memory, one or more virtual devices, such as a network device, an emulated NIC or disk, physical devices over which a guest operating system is given partial or full control, virtual firmware such as a Basic Input/Output System (BIOS) and/or an Extensible Firmware Interface (EFI), and so forth.

In the present example, virtual machines 216, 218, and 220 are virtual machines created and run by the virtual machine monitor 212. Although three virtual machines are shown, there may be any number of virtual machines. In the present example, virtual machine monitor 212 is structured to create and destroy virtual machines, and to assign tasks to the virtual machines. For example, the virtual machine monitor 212 may be structured to create a virtual machine to perform a task and to shutdown the virtual machine after the task is completed. In another example, the virtual machine monitor 212 may be structured to assign a virtual machine a plurality of tasks to perform prior to the virtual machine being shutdown. In addition, virtual machine monitor 212 is structured to hook shutdown messages, events, and/or functions corresponding to virtual machine shutdowns, such that the virtual machine monitor 212 may perform actions based on detecting the shutdown messages, events and/or functions. For example, the virtual machine monitor 212 may detect a shutdown via a hook that is configured to trigger responsive to a shutdown message, event, or function. The virtual machine monitor 212 may be structured with a handler that performs actions based on the hook, such as preserving a memory space corresponding to the virtual machine and/or triggering malware scanning of the memory space by malware scanner 214. An example of a malware scanning method that may be performed by the virtual machine monitor 212 is discussed further with respect to FIG. 4.

In some examples, the virtual machine monitor 212 is structured to create virtual machines that perform load balancing tasks, such that the load balancer 108 shown in FIG. 1 may be implemented via one or more virtual machines run by the virtual machine monitor 212. For example, the load balancing method illustrated in FIG. 3 may be implemented via a virtual machine running on the virtual machine monitor 212. In other examples, the load balancer 108 and the method illustrated in FIG. 3 may be implemented on one or more machines that are separate from the compute host machine 202.

In the present example, each of the virtual machines 216, 218, and 220 are structured to receive tasks from the virtual machine monitor 212 and to perform the tasks. Examples of tasks include, for example, but are not limited to: performing queries, retrieving data, performing data analysis, modifying data, providing a virtual desktop environment, and so forth. In some examples, a remote desktop provided by a virtual machine may be structured to provide a user with a full operating system environment. In other examples, a virtual machine may provide a restricted operating system environment that limits access to specified functions, such as functions to query a database and provide a result of the query. In yet other examples, a virtual machine may be structured to perform one or more tasks corresponding to retrieving data from a memory, such as documents, pictures, audio files, video files, and so forth.

Figure 3:
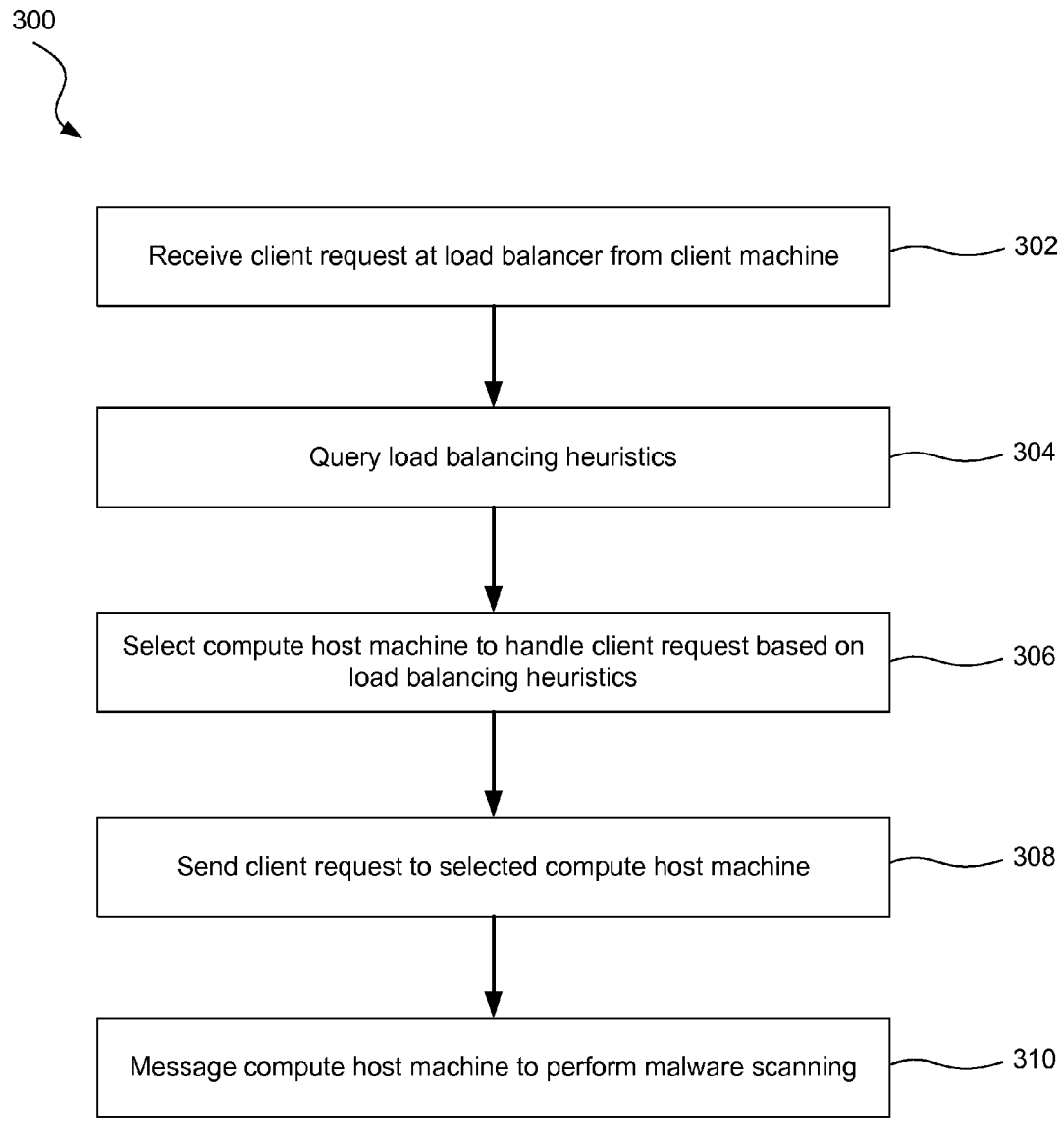
FIG. 3 is a flow diagram showing an illustrative an example of performing load balancing of client requests and malware scanning, in accordance with various examples of the present disclosure.

FIG. 3 is a flow diagram illustrating a method 300 for performing load balancing of client requests and malware scanning, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 300 is performed by the load balancer 108 that is illustrated in FIG. 1. In some examples, the order of the actions described below may also be performed according to alternative orderings. In yet other examples, additional actions may be added and actions that are described may be removed.

At action 302, a client request is received at a load balancer (e.g., load balancer 108) from a client machine (e.g., first client machine 102, second client machine 104, or client machine N 106). In the present example, the client request is a communication that is transmitted via a network (e.g., network 110). In some examples, the client request corresponds to a task to be performed at a compute host machine (e.g., first compute host machine 110, second compute host machine 112, or compute host machine N 114), such as retrieving data, modifying data, storing data, processing data, instantiating a virtual desktop, and so forth.

At action 304, the load balancer queries load balancing heuristics. The load balancing heuristics may include information such as CPU load and memory usage by each of one or more compute host machines. In the present example, the load balancer may query the load balancing heuristics from a local or remote data store, such as a database. The load balancer may also update the load balancing heuristics based on CPU load and/or memory usage information gathered from each of one or more compute host machines, such that the load balancing heuristics are updated over time.

At action 306, the load balancer selects a compute host machine of one or more compute host machines to handle the client request based on the load balancing heuristics. In some examples, the load balancer identifies in the heuristics a compute host machine with a lowest CPU load and/or memory usage to handle the client request. In other examples, other load balancing algorithms may be used, such as by routing client requests to compute host machines according to a random or round robin method. In yet other examples, the load balancer may route client requests to a compute host machine having a fastest response time or a least number of connections. These examples illustrate some of the various load balancing algorithms that may be used at this step to select a compute host machine to handle the client request, although other load balancing algorithms may be used as well.

At action 308, the load balancer communicates the client request to the selected compute host machine. The request may be modified by the load balancer or forwarded in an unmodified form. In the present example, the client request may be sent from the load balancer to the compute host machine via a network. However, in other examples, the load balancer may be run by a virtual machine on a compute host machine, such that the client request may be forwarded to the compute host machine from the load balancer via an intra-machine communication, such as a hypercall, system call, or other virtual machine/virtual machine monitor communication.

At action 310, the load balancer sends a message to the compute host machine that instructs the compute host machine to perform malware scanning corresponding to the client request. In some examples, the instruction to perform malware scanning is included in the client request itself, while in other examples, the instruction to perform malware scanning is sent in a separate communication. Further, in some examples, the instruction to perform malware scanning corresponds to the specific client request, while in other examples the instruction is to perform malware scanning corresponding to a client request of the compute host machine's choosing. For example, the load balancer may provide the compute host machine with a frequency such as a number of malware scans to perform in a particular time window, and the compute host machine may distribute the malware scans among its received client requests to meet the frequency criteria.

Figure 4:
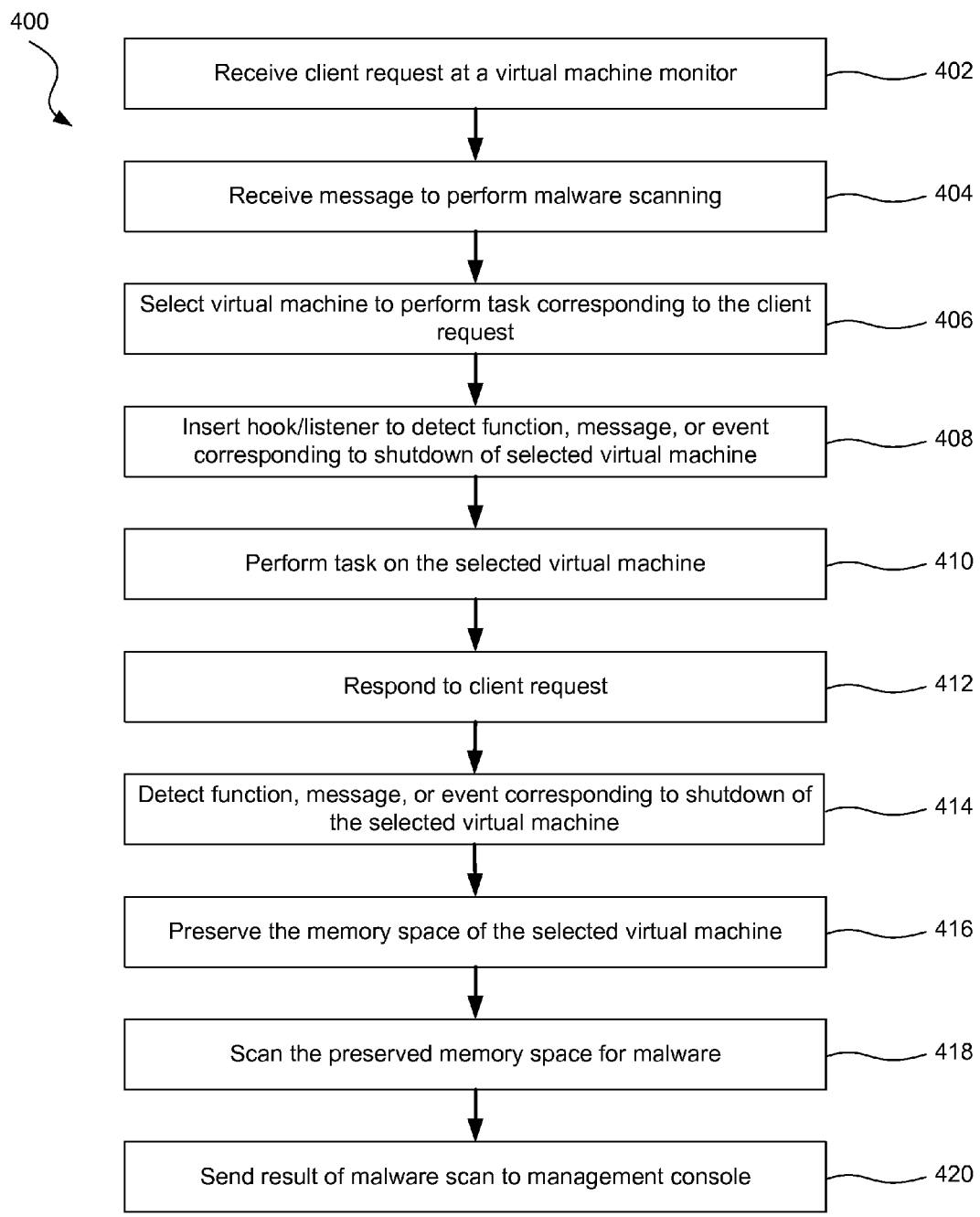
FIG. 4 is a flow diagram showing an illustrative an example of performing malware scanning of a virtual machine memory space, in accordance with various examples of the present disclosure.

FIG. 4 is a flow diagram illustrating a method 400 for performing malware scanning of a virtual machine memory space, according to some examples of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 400 is performed by a compute host machine 202 that is illustrated in FIG. 2, and/or by the first compute host machine 110, second compute host machine 112, and/or compute host machine N 114 that are illustrated in FIG. 1. In some examples, the order of the actions described below may also be performed according to alternative orderings. In yet other examples, additional actions may be added and actions that are described may be removed.

At action 402, a client request is received at a virtual machine monitor of a compute host machine. In the present example, the client request is generated by a client machine that sends the request to a load balancer, which communicates the client request to the virtual machine monitor of the compute host machine. The client request may be received from the client by the virtual machine monitor by way of a network communication medium and/or other communication medium.

At action 404, the virtual machine monitor receives a message to perform malware scanning. In some examples, the message is received from a load balancer, such as load balancer 108 that is illustrated in FIG. 1. In other examples, the message is received from a management console, such as management console 116 that is illustrated in FIG. 1. The message to perform malware scanning may be included with a client request or sent in a separate communication from the client request. In some examples, the message to perform malware scanning may identify a particular client request to which a malware scan corresponds. In other example, the message may provide a more general instruction, such as a frequency of malware scanning that is to be performed, that allows a virtual machine monitor to select particular client requests for malware scanning and perform the malware scanning according to the provided frequency. For example, a malware scanning frequency may indicate that a virtual machine monitor is to perform malware scanning a particular amount of times or for a particular amount of client requests in a time period. This frequency may be based on load balancing statistics, such as CPU load and/or memory usage, which may be provided by a load balancer or determined by a compute host machine.

At action 406, the virtual machine monitor selects a virtual machine to perform a task corresponding to the client request. In some examples, a virtual machine is already running corresponding to another task received from the client. In these examples, the same virtual machine may be selected for the received task. For example, a virtual machine may be running a remote desktop for the client machine. The received client request may be processed by the remote desktop that is running on the virtual machine. In another example, the virtual machine monitor may identify that there are no running virtual machines currently assigned to the client, and create a new virtual machine. Accordingly, the virtual machine monitor may select an existing virtual machine or a new virtual machine, and assign the task to the selected virtual machine.

At action 408, the virtual machine monitor inserts a hook and/or configures a listener to detect a function, message, or event corresponding to a shutdown of the selected virtual machine. In some examples, during runtime of the virtual machine, a function of the operating system running on the virtual machine may be called to insert a hook and/or listener corresponding to a shutdown function. The hook and/or listener may thus be set to trigger upon the shutdown function of the virtual machine being called. In other examples, one or more hooks and/or listeners may be configured at runtime. In yet other examples, a trigger may be configured corresponding to a shutdown prior to runtime of the virtual machine by modifying a binary or library. Accordingly, the virtual machine monitor is configured to detect a shutdown of the virtual machine.

At action 410, the task corresponding to the client request is performed on the selected virtual machine. In some examples, the task is a processing of a query, retrieving of data, modifying of data, or other task. In another example, the client request corresponds to an action to take on a remote desktop, such as accessing/running an application, and/or other remote desktop action.

At action 412, the virtual machine monitor and/or virtual machine may send the client a response to the client request. For example, if the client request was to perform a query, the response sent to the client may be a result of the query. In another example, if the client request was a request for a file, the response to the client may include the file. In other examples, the virtual machine monitor and/or virtual machine may process the client request without sending a response to the client.

At action 414, the virtual machine monitor detects a shutdown of the selected virtual machine.

In the present example, a virtual machine may be shutdown based on a preconfigured criteria. For example, after completing a client request, the virtual machine may be configured to shutdown. In another example, a user may select a shutdown option to shutdown the virtual machine. In yet another example, a timeout of a connection to the virtual machine may trigger a shutdown. These are some examples of preconfigured criteria, although other preconfigured criteria may also be used to trigger a shutdown of the virtual machine.

In the present example, a shutdown function may be called to perform the shutdown. In some examples, an event is raised corresponding to the shutdown. In yet another example, a message may be received at the virtual machine and/or virtual machine monitor corresponding to the shutdown.

In the present example, the shutdown may be detected in various ways. For example, a listener and/or hook may be configured to take action responsive to an event, message, or function call that corresponds to the shutdown. Events, messages, and function calls that correspond to a shutdown may be referred to as indicators of a shutdown. There may also be other indicators of a shutdown in addition to events, messages, and function calls. The triggering of a listener and/or hook responsive to a shutdown indicator may be referred to as detecting a shutdown. In another example, receiving and/or identifying an indicator corresponding to a shutdown may be referred to as detecting a shutdown. These examples illustrate some of a variety of ways in which a shutdown may be detected.

In the present example, the function, message, or event is detected by the hook and/or listener set in action 408. In some examples, the virtual machine monitor and/or virtual machine includes include a handler that is triggered by the hook and/or listener once the shutdown is detected. Accordingly, in response to detecting the shutdown, the handler corresponding to the hook and/or listener may be executed to perform actions prior to the shutdown occurring. In some examples, the shutdown is configured to be performed after completing the actions that are included in the handler, by returning execution to a previously triggered shutdown function. In other examples, the handler is configured to prevent the previously triggered shutdown from occurring and to re-trigger a shutdown function after completing actions that are included in the handler.

At action 416, the handler corresponding to the hook and/or listener is executed to preserve the memory space of the selected virtual machine. In the present example, the handler is executed on the virtual machine monitor. In other examples, the handler may be executed by the selected virtual machine. In the present example, the handler includes actions for preserving the memory space of the selected virtual machine. The memory space of the virtual machine may be preserved by triggering a malware scan prior to shutdown tasks being performed, such that the memory space of the selected virtual machine is not modified, or is relatively unmodified, from the time that the selected virtual machine completed processing the client request and the time that the shutdown is detected. In another example, the memory space of the selected virtual machine may be preserved by including actions in the handler for taking a snapshot of the memory space of the virtual machine prior to shutting down the virtual machine. For example, all or a portion of the memory space assigned to the virtual machine by the virtual machine monitor may be saved to one or more files.

At action 418, the handler corresponding to the hook and/or listener triggers a scan of the preserved memory space for malware. For example, the handler may trigger the malware scan by executing one or more external malware scanners and passing one or more files or memory addresses to the malware scanners, such that the malware scanners are provided the preserved memory space for performing the scan. In this example, the memory addresses may include, for example, a start memory address, an end memory address, and/or a size of the memory to scan. In another example, the handler may provide a pointer or a file address corresponding to the preserved memory space to the malware scanners. In some examples, the malware scanners are executed on the compute host that is running the virtual machine monitors. In other examples, the preserved memory space may be passed to an external machine, or to a virtual machine that performs the malware scanning.

In the present example, the malware scanning may be performed prior to shutting down the selected virtual machine. For example, the handler may trigger the malware scanning, and after completion of the malware scanning allow the selected virtual machine to perform the shutdown. In other examples, the malware scanning may be performed after the selected machine is shutdown, by performing the malware scanning on one or more snapshot files that were saved prior to performing the shutdown of the selected virtual machine.

In the present example, one or malware scanners may perform the malware scanning by comparing portions of programs and/or data stored in the preserved memory space with a plurality of malware signatures to identify matches. In other examples, other malware scanning methods may be performed instead of, or in addition to, identifying malware signature matches.

At action 420, the result of the malware scan is sent to a management console, such as management console 116 that is illustrated in FIG. 1, which may be located on the compute host machine or on a separate machine. The result of the malware scan may include, for example, an identification of any malware detected in the malware scan by the one or more malware scanners. The result of the malware scanning may additionally include metadata corresponding to the scan, such as metadata corresponding to the client request that was being performed on the selected virtual machine, the identity of the compute host machine that hosted the selected virtual machine, identifiers corresponding to the client that initiated the client request, and/or other metadata corresponding to the malware scanning.

In the present example, the management console may process the result of the malware scanning, such that the result may be presented to one or more users. In another example, the result of the malware scanning may trigger additional actions, such as targeting the compute host machine for additional malware scanning, or targeting requests from a particular client for malware scanning.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for detecting malware in a virtual environment comprising:
   selecting, by a virtual machine monitor, a virtual machine to perform a task corresponding to a client request;
   performing the task at the virtual machine;
   after performing the task at the virtual machine, detecting an indicator corresponding to a shutdown of the virtual machine;
   after detecting the indicator and prior to the shutdown of the virtual machine, storing a snapshot of a memory space corresponding to the virtual machine;
   providing the snapshot to an external machine; and
   after the shutdown of the virtual machine, performing, on the external machine, a malware scan of the snapshot, the malware scan including comparing at least a portion of the snapshot to malware signatures, wherein a result of the malware scan includes metadata corresponding to the client request.

2. The method of claim 1, further comprising:
   sending the result of the malware scan to a management console.

3. The method of claim 1, the selecting comprising:
   creating, by the virtual machine monitor, the virtual machine.

4. The method of claim 1, further comprising:
   receiving, from a load balancer, a client request corresponding to the task;
   querying, at the load balancer, load balancing heuristics;
   selecting, based on the load balancing heuristics, a compute host machine to handle the client request;
   sending the client request to the compute host machine; and
   receiving the client request at the virtual machine monitor, wherein the virtual machine monitor is running on the compute host machine.

5. The method of claim 1, wherein the indicator comprises a function call, message, or event.

6. The method of claim 4, further comprising:
   adjusting, based on the load balancing heuristics, a frequency of malware scanning.

7. A non-transitory computer-readable medium having stored thereon machine-readable instructions executable to cause a machine to perform operations comprising:
   creating, by a virtual machine monitor, a virtual machine;
   performing, at the virtual machine, one or more tasks corresponding to a client;
   after performing the one or more tasks, detecting an indicator corresponding to a shutdown of the virtual machine; and
   after detecting the indicator and prior to the shutdown of the virtual machine, storing a snapshot of a memory space corresponding to the virtual machine;
   providing the snapshot to a malware scanner that is external to the virtual machine; and
   after the shutdown of the virtual machine, performing a malware scan of the snapshot, the malware scan including comparing at least a portion of the snapshot to a malware signature, wherein a result of the malware scan includes metadata corresponding to the client.

8. The non-transitory computer-readable medium of claim 7, wherein the performing of the malware scan comprises scanning the snapshot by a plurality of malware scanners.

9. The medium of claim 7, wherein the indicator comprises a function call, message, or event.

10. The medium of claim 9, wherein the indicator is detected by a hook that is set at least in part by the virtual machine monitor.

11. A system for detecting malware comprising:
    a processor and a memory;
    a virtual machine monitor that is executed by the processor to create a virtual machine, wherein the virtual machine is assigned to a portion of the memory;
    the virtual machine monitor to:
       receive a client request;
       set a hook corresponding to an indicator of a shutdown of the virtual machine;
       detect, based on the hook, the indicator of the shutdown of the virtual machine;
       after detecting the indicator and prior to performing the shutdown of the virtual machine, store a snapshot of the portion of the memory;
       provide the snapshot to a malware scanner that is external to the virtual machine; and
       trigger a malware scan corresponding to the snapshot, the malware scan occurring after the shutdown of the virtual machine, the malware scan including comparing at least a portion of the snapshot to malware signatures, wherein a result of the malware scan includes metadata corresponding to the client request.

12. The system of claim 11, further comprising:
    a load balancer that selects a compute host machine that runs the virtual machine monitor, the load balancer to route the client request to the compute host machine.

13. The system of claim 12, wherein the load balancer selects the compute host machine based on at least one load indicator selected from at least one of: a CPU load corresponding to the compute host machine or a memory usage corresponding to the compute host machine.

14. The system of claim 11, wherein the malware scan comprises scanning the snapshot for malware by a plurality of malware scanners.

15. The system of claim 11, wherein the indicator of the shutdown comprises a function call, message, or event.

16. The method of claim 1, wherein the external machine comprises a compute host machine that provides the virtual machine and the virtual machine monitor.

17. The method of claim 16, wherein providing the snapshot to the external machine comprises providing a memory address of the snapshot to the compute host machine.

18. The non-transitory computer-readable medium of claim 7, wherein the malware scanner is executed on a compute host machine that runs the virtual machine and the virtual machine monitor.

19. The non-transitory computer-readable medium of claim 18, wherein providing the snapshot to the malware scanner comprises providing a memory address of the snapshot to the compute host machine.

20. The system of claim 11, wherein the malware scanner is executed on a compute host machine that runs the virtual machine and the virtual machine monitor.

* * * * *